Figure 1:
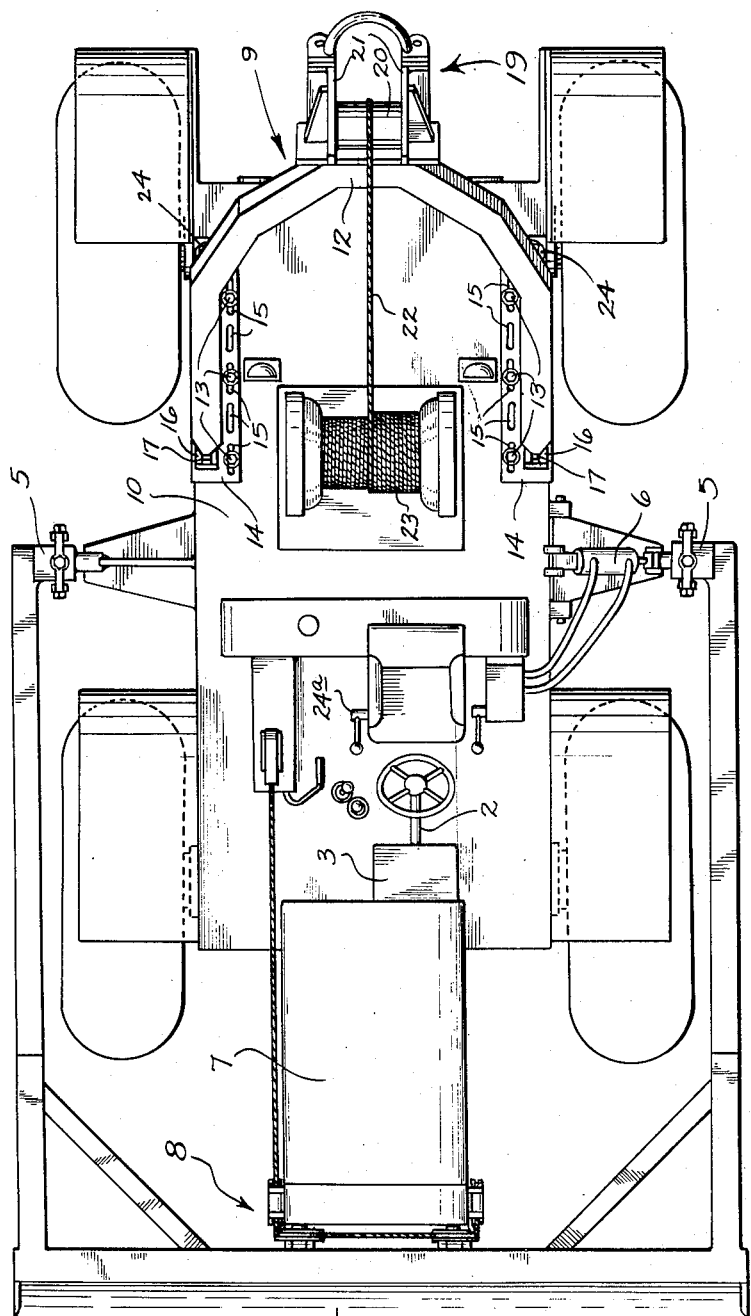

INVENTOR.
Paul Westfall

INVENTOR.
Paul Westfall

Oct. 12, 1954 P. WESTFALL 2,691,451
ARTICULATED ARCH FOR TRACTORS
Filed April 14, 1951 3 Sheets-Sheet 3

INVENTOR.
Paul Westfall
BY
Atty.

Patented Oct. 12, 1954

2,691,451

UNITED STATES PATENT OFFICE 2,691,451

ARTICULATED ARCH FOR TRACTORS

Paul Westfall, Portland, Oreg.

Application April 14, 1951, Serial No. 221,110

3 Claims. (Cl. 214—92)

This invention relates to an articulated, U-shaped arch, of the type used in the logging industry, adapted to be mounted upon a tractor at a selected distance forward of the tractor rear or driving axle. Thus, one object of the invention is directed toward the pivotal mounting of a loading or logging type arch upon a tractor in such a manner and with such a nicety of balance that the use of the arch, both for lifting and hauling, will add to rather than subtract from the traction or ground-gripping forces available for moving the tractor.

The logging industry, in the United States and Canada, employs as many different logging techniques as there are different logging conditions, regions, and tree types. In the Douglas fir regions of western Oregon, Washington, and British Columbia, however, the selective cut logging technique now is prevalent. Over the years, the most practical, economical, and efficient tool for use in the practice of this particular technique has proven to be the logging arch. My invention is concerned with a loading or logging arch of this type and is bottomed upon and best explained with reference to the practice of the selective cut logging technique.

Two similar types of logging arches commonly are used in the Pacific Northwest. Both of these types, in general, resemble a huge metal wishbone having a crawler or wheels supporting the spaced legs of the wishbone shape and carrying a fairlead roll or pulley at the point of joinder of the legs. The first type, commonly known as the straddle mounted arch, employs an axle having a wheel at each end. Logging men who prefer this arch claim it offers a measure of safety in that logs are prevented from overrunning the arch and reaching the tractor seat and operator. The second type, termed the A frame arch, employs crawler-type wheels. Those favoring this arch claim it provides greater lateral stability and a maximum of operating visibility.

Whichever arch is used, the operational technique is the same. Thus, a tractor or bulldozer, equipped with a power winch and draw bar, tows the arch. During the first or yarding phase of the operation, a cable is payed out from the winch, up and over the fairlead roll, and out to a distantly located log or bundle of logs. Thereafter, the cable is secured to the log bundle, the winch is started and the logs are drawn or yarded toward the arch, from a distance up to a quarter mile.

In the second phase of this technique, the logs are towed or "ground skidded" to a central assembly or loading area. Thus, with the logs directly in back of the arch, the tractor operator can lift one end of the bundle free of the ground by taking up on the cable. As the cable is reeved in over the fairlead roll, it lifts the near end of the log bundle and puts the cable under considerable tension. With most conventional arches, this lift, in combination with the horizontal force component of the tension in the cable, pivots the arch about a horizontal axis to swing the log bundle up and over the rear end of the tractor in position for roading or towing. Thereafter, the tractor "roads" the arch loaded bundle to the loading area. That is to say, the tractor draw bar pulls the arch while the winch maintains the cable tension. The arch, together with the cable suspension, drags the logs behind. During this operation, it is to be noted, an upward pulling force is exerted on the winch by the tension in the cable.

Many engineering studies and experiments have been made in connection with the design of logging arches. These studies, in general, have resulted in the design of vastly improved arches. Thus, the relative position and design of the arch pivot, fairlead overhang, wheels or crawlers, fairlead roll, draw bar, and roll height, have, through the years, been modified and refined innumerable times. I, too, have made an extensive study of and have conducted numerous experiments with respect to logging arches. These studies have convinced me, however, that a truly revolutionary arch improvement must be bottomed upon a return to fundamentals rather than upon a mere piecemeal, element by element, design advance. Accordingly, I have first directed my attention to the prime disadvantage inherent in all arches. This disadvantage is born of the fact that every manipulation, every action, and every actuation of an arch removes weight from and exerts a lifting force upon the tractor through the medium of the tension in the cable and pull of the winch.

To this end, let us examine a typical yarding and roading operation. A twenty ton tractor, conventionally, is supported with eight tons on the front axle or sprockets and twelve tons on the rear axle (this is an example and all weights are approximate). Should the winch and cable exert a ten ton pull, at 45 degrees to the horizontal (that is, the fairlead roll lies approximately on a 45 degree angle upward from the winch), a seven ton vertical, upward force component is exerted on the rear of the tractor (this result is obtained from an equilateral force triangle having a hypotenuse equal to ten and two legs equal to seven when the subtended angles are both 45 degrees). If the tractor attempts to road such a load, it will, in all probability, skid and slip, since only five tons of weight or mass are left to provide a tractive force or frictional ground-engagement force. That is to say, only five of the original twelve tons remain, bearing downwardly, on the rear axle or sprockets to provide weight for the ground engagement of the wheels or tracks. In fact, every logging man, at one time or another, has seen the rear end of a woods tractor actually lifted off the ground by too great an arch load. Thus, the prime disadvantage of all logging arches is their tendency, through the tension in the cable and the resultant force on the winch, vertically to lift the tractor, thereby to decrease the available tractive force.

In the aforementioned Douglas fir belt of western Oregon, Washington, and British Columbia, this tractive decrease disadvantage is amplified by the peculiar weather conditions encountered. Thus, west of the Cascades and, more particularly, west of the Coast Range and the Olympics, the annual rainfall often exceeds 100 or 150 inches. Logging, in these regions, almost invariably is conducted in the wet and mud, fire hazards requiring the closing down of logging operations during the summer months. Furthermore, more often than not, the woods tractors and logging arches must work in a veritable quagmire. These conditions, therefore, not only require that as little weight as possible be removed from the traction or driving wheels, but they also bottom the need for a second feature of my invention.

In summary, both of my inventive features are combined in a single, unitary arch and tractor structure as opposed to the conventional separate arch and tractor structure. Firstly, I mount the arch directly upon the tractor itself. A mere haphazard mounting location, however, is insufficient if it fails to take into account the aforementioned tractive force disadvantage. For example, an arch or winch located behind the rear axle would not serve my inventive objects (it is conventional to mount the winch in this location on the present day woods tractors). Accordingly, my logging arch and winch both are mounted forward of the rear axle and intermediate the front and rear axles. Thus, any lifting force resulting from an operation of the winch in combination with the logging arch is counterbalanced by an operative, downward force exerted by the shear legs of the arch. One of the prime advantages of my invention, therefore, is the attainment of a balanced logging arch and tractor structure wherein adequate tractive force always is available, irrespective of the magnitude of the load hauled or lifted. In fact, the tractive force available with my invention increases rather than decreases as the magnitude of the load is increased.

Secondly, within the scope of my invention, the wheeled tractor is preferred to the track-laying type. Thus, while my novel arch and winch are equally as useful with either tractor type, I have found that many additional advantages flow from the use of a wheeled tractor. To recount a few of the disadvantages of tracks, they are expensive; they wear unduly; tracks present complex repair problems in the woods; they add excessive dead weight to the tractor; and they are noisy. Furthermore, cleat-type vehicles are barred from many highways by state law since they tear up the road beds. Thus, a special trailer must be provided to carry a track-laying tractor from one logging operation to another. In short, the wheeled tractor is less expensive, lighter, easier to repair, and less costly to operate. Furthermore, if correctly designed, it will exert more tractive pulling force than will a track-laying tractor. Above all, the wheeled tractor is much easier to power, steer and control both on the open highway and in the woods.

Accordingly, another object of my invention is to provide a wheeled tractor which, in combination with my novel arch and winch structure, more efficiently and economically will serve the logging industry, special attention being given to those logging operations conducted west of the Coast Range and Olympic Mountains.

A further object of my invention is to provide a motor or fluid pressure means, also in combination with a tractor mounted logging arch, which motor means will articulate and pivot the arch about a horizontal axis independent of the cable tension forces, thereby more quickly and efficiently to load and haul logs.

Yet another object of my invention is to provide a control mechanism for operating the aforementioned motor means, said control to be located closely adjacent the driver, materially to aid in achieving an efficient, continuous logging technique.

Figure 2:
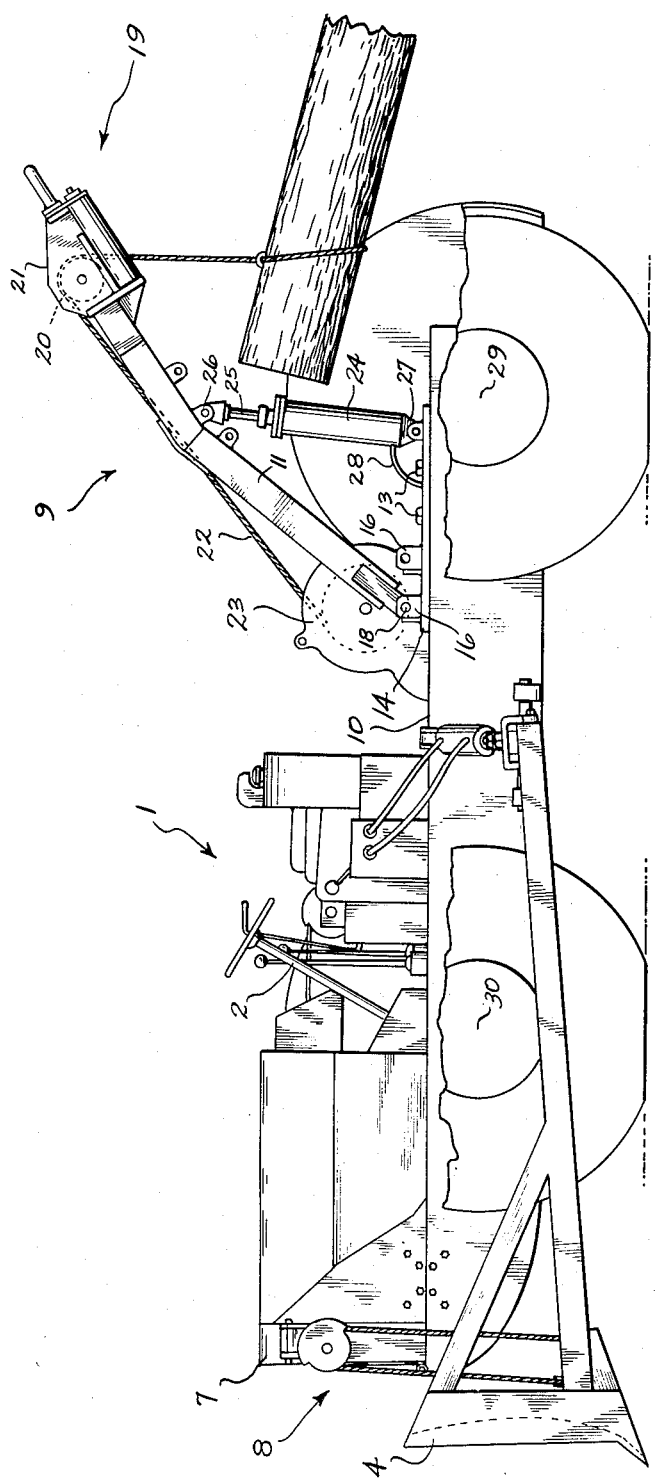
Figure 3:
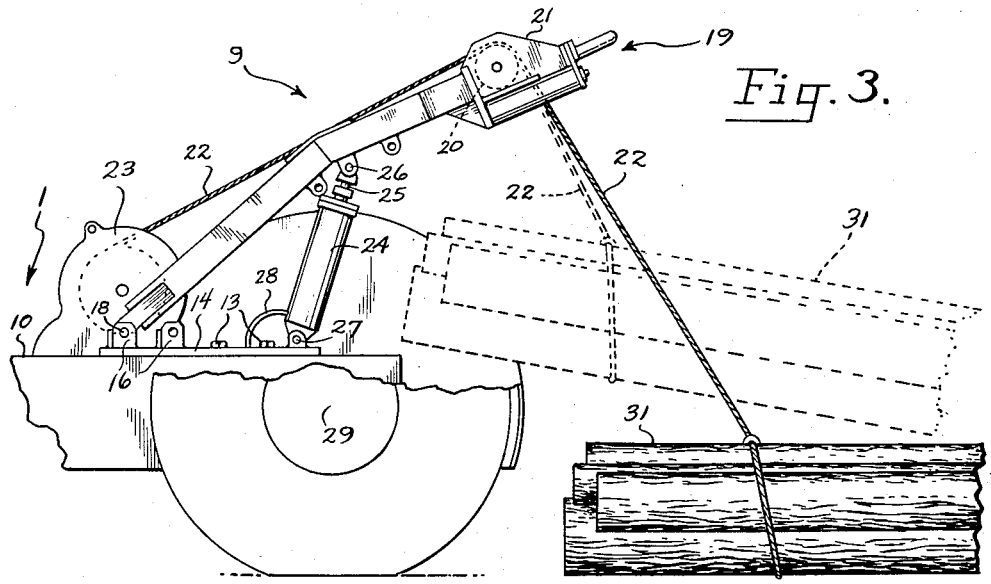
Figure 4:
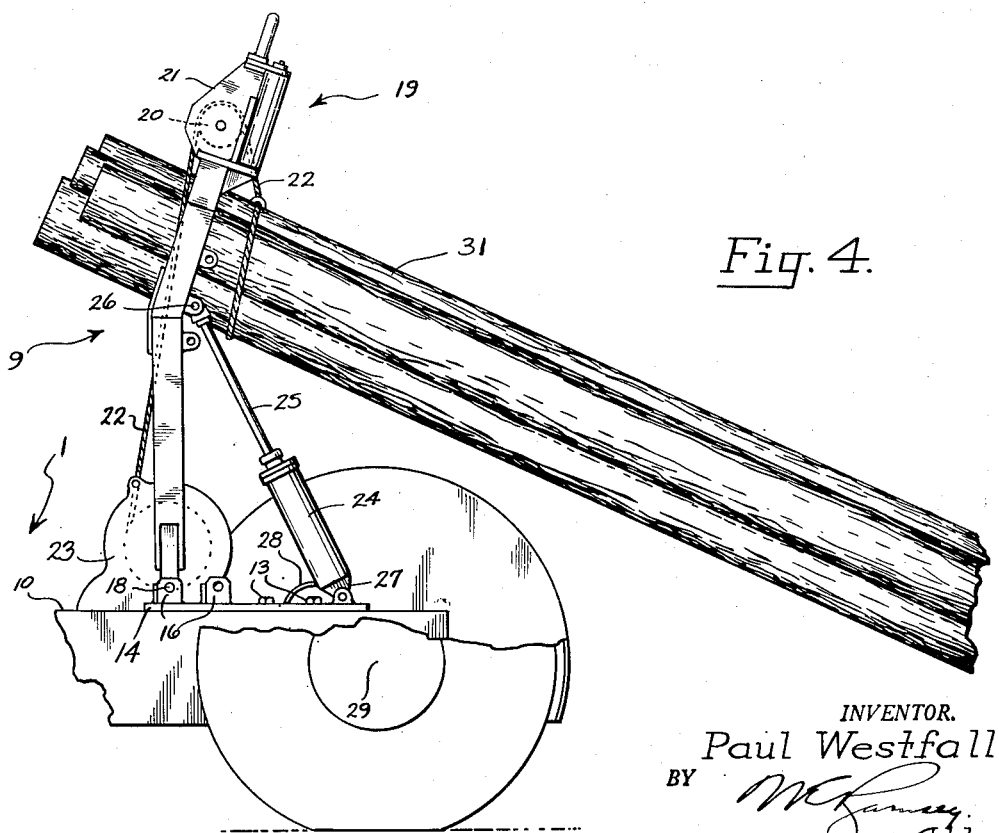

In the following detailed description, further advantages and inventive objects will be set forth with reference to the accompanying drawings, wherein:

Fig. 1 is a top or plan view of a wheeled tractor having a logging arch and power winch mounted thereon in accord with my invention;

Fig. 2 is a side view of the tractor of Fig. 1, better indicating the manner in which the U-shaped logging arch and power winch are mounted forward of the rear axle of the tractor and intermediate the front and rear axles; and Figs. 3 and 4 are related schematic drawings indicating an operative sequence as practiced with my invention and better showing the function of the hydraulic piston and cylinder means which are utilized to pivot my logging arch about a horizontal axis parallel to the rear axle of the tractor.

In the drawings, I have illustrated a wheel type tractor 1. As will become evident from the following description, however, my novel arch and winch structure also may be mounted upon a track-laying or cleat-type tractor. Thus, I have also illustrated a central control column 2 which is journaled in a control housing 3 to steer the tractor. This control and steering mechanism, while forming no part of the instant invention, is fully disclosed and described in my copending application Serial No. 221,112, filed April 14, 1951, and entitled Clutch and Brake Control Mechanism.

As an accessory or secondary work tool, the tractor 1 may carry a bulldozer blade 4 which is mounted pivotally on the sides of the tractor as at 5, and which is tiltable about an axis parallel to the longitudinal axis of the tractor by a fluid pressure mechanism 6. Again, this pivot and tilt mechanism forms no part of the instant invention. The details thereof, however, are set forth in my copending application Serial No. 221,109, filed April 14, 1951, and entitled Bulldozer Blade Arm Mounting.

Conventional bulldozers or tractors employ either a hydraulic motor mechanism or a cable and pulley mechanism to raise and lower the blade 4. Although either type mechanism may be employed in conjunction with the instant invention, I have illustrated a cable and pulley mechanism 8 which is mounted directly upon the hood of the tractor 7 in accord with the invention disclosed in my copending application Serial No. 221,111, filed April 14, 1951, and entitled Hood Mount and Hoist Mechanism for Bulldozer Blade.

In accord with the preferred use of the instant invention (the practice of the selective cut logging technique in the Douglas fir belt of western Oregon, Washington, and British Columbia), I have mounted a rigid U-shaped arch 9 directly upon the deck 10 of the tractor 1. The arch 9 includes two shear legs 11 joined by a crosspiece 12 and, preferably, constructed in the manner of a hollow, welded steel box frame member. This massive box frame structure is preferable because of the heavy loads to be carried thereby while yarding and roading logs. Optionally, of course, this same massive structure may be employed in other industries and for other purposes such as the salvage of heavy military equipment and tanks.

Secured at each side to the deck 10 of the tractor 1, as by studs 13, I have shown a pair of heavy frame plates 14. To provide for a fore and aft adjustment of each plate 14 with respect to the deck 10, the studs 13 engage the blade through a plurality of elongated slots 15. In addition, each of the plates 14 carries a plurality of journal ears 16 spaced at varying distances, fore and aft, therealong.

To provide a pivotal mount for the loading arch 9, each of the shear legs 11 terminates in a pierced pivot member 17. Thus, a pivot pin 18 is utilized to join each pivot member 17 to a mated one of the journal ears 16. Selectively and as may be desired, the fore and aft location of the arch 9 may be changed by journaling the pivot members 17 upon a different pair of ears 16 and/or by moving the plates 14 fore and aft.

The crosspiece 12 (see Fig. 1) carries a conventional fairlead or rotatable line support 19 journaled thereon. This fairlead may have one horizontal roller 20 and two vertical flash plates 21 as shown, or it may have one horizontal roller and two oblique rollers to serve the same purpose. In any event, the function of the fairlead roll 19 is to journal and guide the cable or line 22 during a loading or logging operation.

Intermediate the journal members 16, 17, 18, I have fixed a power winch 23 to the tractor deck 10. This winch 23, as shown in Fig. 1, operatively carries the cable 22, through the fairlead 19, to yard or road logs, tanks, etc.

As previously mentioned, most conventional arches, in combination with the horizontal force component exerted by the tension in the cable 22 upon the fairlead 19 when the power winch 23 is hauling in, pivot the arch 9 to swing the logs into the correct position for roading or towing. Within the scope of my inventive concept, however, this pivot or swing of the arch 9 about the pivot axis defined by the journal pins 18, is best accomplished through the medium of a pair of hydraulic piston and cylinder units 24 having a common control mechanism 24a. Each such hydraulic motor or unit includes a piston rod 25 joined pivotally to one of the shear legs 11 as at 26. In addition, each hydraulic motor 24 is journaled on a corresponding frame plate 14, as at 27, to fix the motor to the deck of the tractor. Thus, as the control mechanism 24a is manipulated, pressure fluid is supplied to and exhausted from the hydraulic motors 24 through the conduit 28. The movements of the motors 24 pivot the arch 9 selectively to raise or lower the load carried thereby. The fact that the control mechanism 24a is located adjacent the driver's seat and distantly from the motors 24, provides an ease of control lacking in the conventional arch.

Referring more particularly to Figs. 2, 3, and 4, I have shown the end of a conventional lateral shaft or rear axle member 29. Optionally, this member either may carry the sprockets for driving the endless tracks of a track-laying type tractor or may be joined to the wheels of a wheeled type tractor. In any event, it is this lateral rear axle 29 and the front axle 30 which define the datum planes bottoming a thorough understanding of my inventive concept. That is to say, when the tractor 1 is steered straight ahead, the front and rear axles 30 and 29, respectively, lie in parallel vertical planes. Intermediate these planes, the entire arch, hydraulic motor, and power winch mechanism is located. Thus, my prime inventive object is directed toward the pivotal mounting of the logging arch 9 upon the tractor 1 in such a manner and with such a balance that the use of the arch, both for lifting and hauling, will add to rather than subtract from the tractive forces available for moving the tractor. That is to say, no matter what the weight of the bundle of logs 31 or other load, the tractor 1 is not unbalanced nor does it exhibit any propensity to tip about either of the lateral axles 29 or 30.

Turning now to Figs. 3 and 4, I have therein shown a typical operative sequence as practiced with my inventive mechanism during the yarding and roading of the bundle of logs 31. In Fig. 3, the full line position is assumed just after the logs 31 have been yarded from perhaps a quarter mile away to a position directly adjacent the rear of the tractor 1. In the dashed line position of Fig. 3, the log bundle 31 has been lifted by hauling in on the cable 22 through the medium of the power winch 23. During this lifting operation, it will be noted, the power winch 23 tends to be pulled upwardly because of the tension in the cable 22 caused by the downward pull of the bundle 31. With the conventional logging arch, this upward force component tends to lift the rear axle and the tractor upwardly. With my novel structure, however, this upward lift on the winch 23 is balanced by an equal and opposite downward push exerted through the hydraulic motors 24, the shear legs 11 and the journal or pivot structure 18. Further in accord with my invention, it will be remembered that the bottom pivots 27 of the hydraulic motors 24 and the journals 18 for the shear legs 11 both are located forward of the rear axle 29. Thus, both the downward and upward forces exerted by the aforementioned lifting operation are impressed upon the tractor intermediate the front and rear axles 30 and 29. This location is critical to my invention since the tractor 1 thereby is balanced or weighted down rather than lifted or tilted.

Continuing the logging operation, the second operative sequence includes the pivotal movement of the arch 9 about the axis of the pivots 18 by the hydraulic motors 24 (compare Figs. 3 and 4). This pivotal movement may be made either after the log bundle 31 is snubbed tight against the crosspiece 12 or while the winch 23 continues to haul in on the cable 22. In other words, the winch and hydraulic motor movements must be correlated by the driver to accomplish an efficient lifting technique. In the position of Fig. 4, the log bundle 31 is ready for the roading phase of the logging operation. Thus, the tractor 1 now will be moved to a central assembly or loading area and the log bundle 31 will drag thereafter. Such a ground skid operation is conventional in the logging industry. The practice of this operation, however, with my novel articulated arch is novel since the tractor 1 will not skid or slide should the access roads be muddy and slippery.

Returning now to Fig. 1, it will be seen that each pair of the journal ears 16 is mated to a companion pair on the opposite side of the tractor 1. Thus, each of these pairs of ears 16 defines a horizontal pivot axis for the arch 9. Such an axis is parallel to the axis defined by the rear shaft or axle 29. In accord with my inventive objects, this lateral, horizontal pivot axis is located forward of the rear axle 29 as are the winch 23 and the hydraulic motors 24. Thus, I have served these inventive objects by providing a balanced tractor and logging arch capable of yarding and hauling a massive load without tipping or detracting from the tractive force of the tractor. Furthermore, I have provided a hydraulic motor to articulate and pivot my arch about a horizontal axis independent of the forces exerted by the hauling cable and winch. Still further, I have provided a control mechanism for operating this hydraulic motor means, which control mechanism is located distantly from the rear axle in close proximity to the driver. In summation, the cumulative value of these inventive features are of material aid to the efficient, continuous practice of the selective cut logging technique employed in the Douglas fir regions of the Pacific Northwest.

I claim:

1. A lifting and hauling structure mounted upon an elongated tractor having front and rear axle members, comprising a rigid U-shaped frame having two shear legs joined to a crosspiece to define an arch, a series of interchangeable journal members carried at varying distances forward of said rear axle, the terminal ends of said shear legs being joined to a mated pair of said journal members for pivotal movement about an axis parallel said rear axle, and fluid pressure means bearing on said shear legs and mounted at a selected distance forward of said rear axle to pivot said arch about said axis.

2. A lifting and hauling structure mounted upon an elongated tractor having front and rear, wheel-carrying axles, comprising a rigid U-shaped frame having two shear legs joined to a crosspiece to define an arch, a rotatable line support journaled on said crosspiece, a series of interchangeable journal members carried on each side of said tractor at varying distances forward of said rear axle, each said shear leg being joined to one of a mated pair of said journal members, fluid pressure means bearing on said shear legs and mounted forward of said rear axle to pivot said arch, said fluid pressure means including a control mechanism located distantly from said rear axle, a work line passing over said line support and leading fore and aft therefrom, and means carried forward of said rear axle for hauling in said work line, said last named means including a power winch mounted intermediate said mated pair of journal members.

3. A lifting structure mounted upon a tractor having front and rear axle members, comprising a rigid arch member having spaced shear legs, a plate adjustably fixed to each side of said tractor forward of said rear axle, a plurality of journal members carried by each said plate at varying distances forward of said rear axle, each said shear leg being mounted pivotally on one of a mated pair of said journal members, and means bearing on said shear legs for pivoting said arch on said journal members.

References Cited in the file of this patent

UNITED STATES PATENTS

| Number | Name | Date |
| --- | --- | --- |
| 1,019,268 | Melzer | Mar. 5, 1912 |
| 1,793,545 | De Rocher | Feb. 24, 1931 |
| 1,909,689 | Kuchar | May 16, 1933 |
| 2,019,933 | Stephens | Nov. 5, 1935 |
| 2,058,473 | Le Tourneau | Oct. 27, 1936 |
| 2,179,779 | Dempster | Nov. 14, 1939 |
| 2,389,872 | Ruger et al. | Nov. 27, 1945 |
| 2,394,940 | Shoemaker | Feb. 12, 1946 |
| 2,433,593 | Chadwick, Jr. | Dec. 30, 1947 |
| 2,575,262 | Eakin | Nov. 13, 1951 |